United States Patent
Gadini

[11] Patent Number: 5,929,345
[45] Date of Patent: Jul. 27, 1999

[54] DEVICE FOR THE CONTROL OF THE QUANTITY AND/OR THE FLOW RATE OF A LIQUID

[75] Inventor: Costanzo Gadini, Casale Monferrato, Italy

[73] Assignee: Eltek S.p.a., Casale Monferrato, Italy

[21] Appl. No.: 08/657,355

[22] Filed: Jun. 3, 1996

[30] Foreign Application Priority Data

Jun. 6, 1995 [IT] Italy ................................ TO95A0470

[51] Int. Cl.$^6$ ........................................ G01F 1/08
[52] U.S. Cl. ........................................ 73/861.81
[58] Field of Search ................ 73/861.83, 861.81, 73/861.91, 861.84

[56] References Cited

U.S. PATENT DOCUMENTS

| | | | |
|---|---|---|---|
| 3,857,446 | 12/1974 | Kenny | 169/60 |
| 3,877,304 | 4/1975 | Vetsch | 73/231 M |
| 4,155,253 | 5/1979 | Kato et al. | 73/861.83 |
| 4,419,052 | 12/1983 | Stamm | 73/861.83 |
| 4,694,681 | 9/1987 | Hoffmann | 73/861.83 |

*Primary Examiner*—George M. Dombroske
*Assistant Examiner*—Jewel Artis
*Attorney, Agent, or Firm*—Levine & Mandelbaum

[57] ABSTRACT

A device for monitoring the flow rate of a liquid has an impeller with a plurality of blades arranged within a duct wherein the liquid flows, and a sensor able to detect the rotation of the impeller. A variable distributor is mounted in the duct for modifying the ratio between the number of revolutions of the impeller and the rate liquid flow in the duct in order to control the resolution of the device.

24 Claims, 4 Drawing Sheets

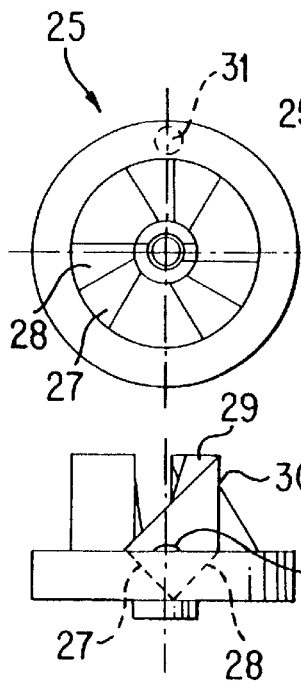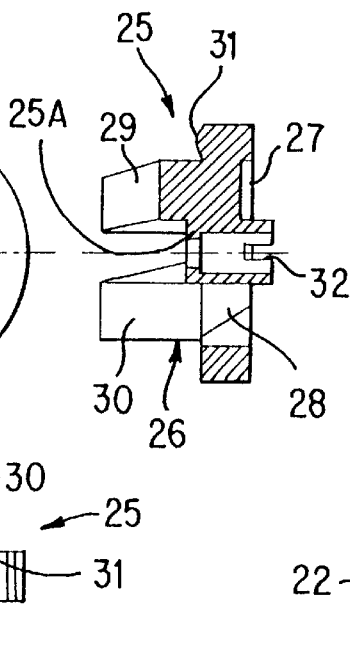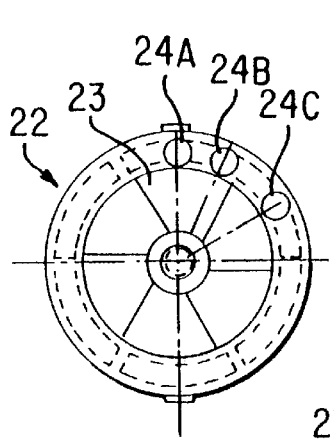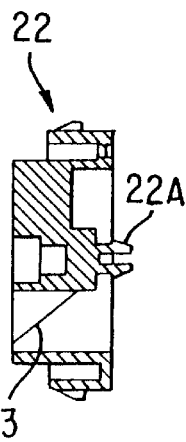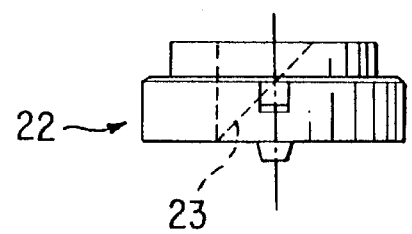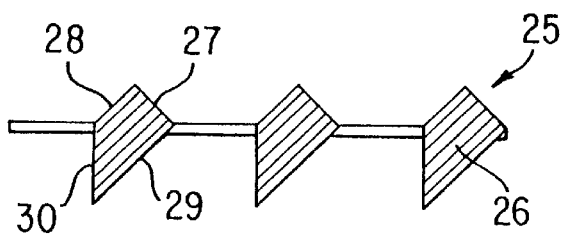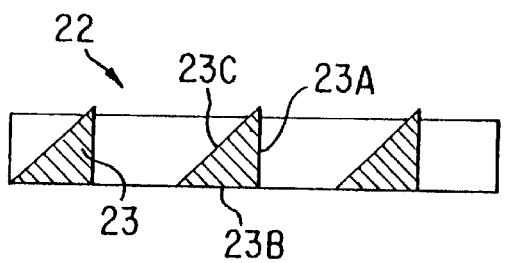

DEVICE FOR THE CONTROL OF THE QUANTITY AND/OR THE FLOW RATE OF A LIQUID

FIELD OF THE INVENTION

The present invention refers to a device for the control of the quantity and/or the flow rate of a liquid.

BACKGROUND OF THE INVENTION

A device of this type is known for example by the Italian Patent Application No. AL92A000003, in the name of the same Applicant.

Said document describes a device which can be connected to a fluid supply line, for realizing the measuring and/or the volumetric control of the fluid itself; said device comprises a body having an inlet duct, which can be connected to the cited supply line, and an outlet duct, which can be connected to an utilizing apparatus being downstream the device; the device comprises a flow sensor of the fluid which flows between the inlet duct and the outlet duct, which comprises an impeller and a unit being able to detect the rotation of said impeller; said unit provides for determining, on the basis of the number of the impeller revolutions, the quantity of the fluid which flows between the inlet duct and the outlet duct of the device.

Measurement devices of the above cited type are useful for several types of utilizing apparatuses (washing machines, dosing devices, means, etc); in practice, the manufacturers of such devices have therefore to realize a wide range of models, each having specific characteristics in function of their type of use; this fact is obviously in contrast with the normal standardization needs.

On the other hand, a measuring device being provided for a first specific application, can give rise to drawbacks, when used for a second different application; for example, a typical drawback can be the rapid degrade, due to the greater wear of the mechanical details, that occurs when a measuring device is concerned with flow of liquid being greater than that for which the same has been realized.

OBJECT OF THE INVENTION

The present invention is based on the acknowledgement of the fact that the functional characteristics of devices being of the cited type can be improved, in order to allow for the same or greater flexibility of use and a longer useful life.

Within said frame, as it will be better explained in the following, the present invention has the aim of realizing a device for the control of the quantity and/or the flow of a liquid, being of compact realization and low-cost, the measure resolution of which can be modified in a simple way, in function of the type of application selected for the device.

Such aims are reached according to the present invention through a device for the control of the quantity and/or the flow of a liquid having the characteristics of the annexed claims, that summarize the teachings of the invention.

BRIEF DESCRIPTION OF THE DRAWINGS

The characteristics and advantages of the present invention will result in being clear from the specific description that follows and from the annexed drawings, supplied purely as an explanatory and non-limiting example, in which:

FIG. 6 is a view in projection and partial section of a first element of the device of FIG. 5;

FIG. 7 is a view in projection and partial section of a second element of the device of FIG. 6;

FIG. 8 is a schematic section of the element of FIG. 6;

FIG. 9 is a schematic section of the element of FIG. 7;

DETAILED DESCRIPTION OF THE INVENTION

Figure 1:
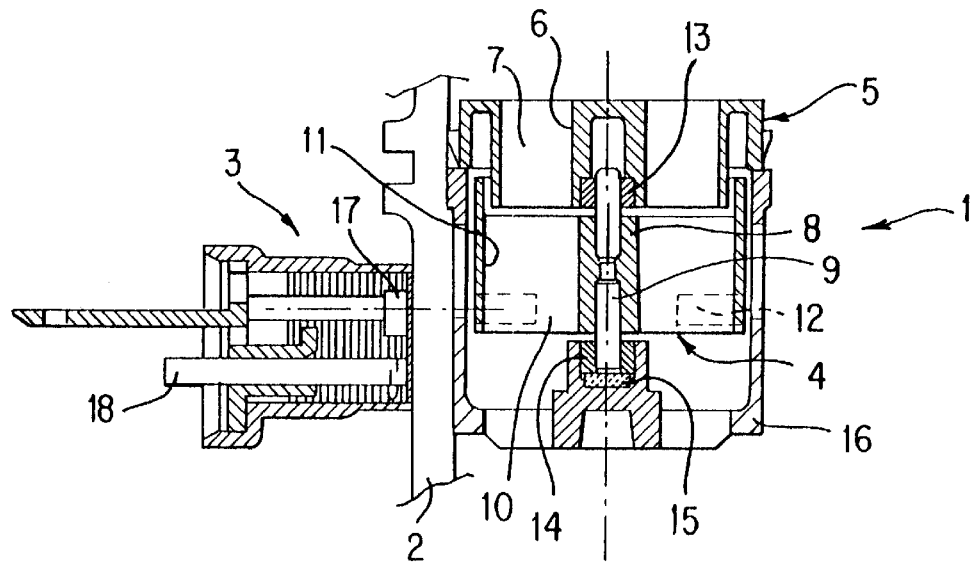
FIG. 1 is a view in section of a flow meter of the known type.
Figure 2A:
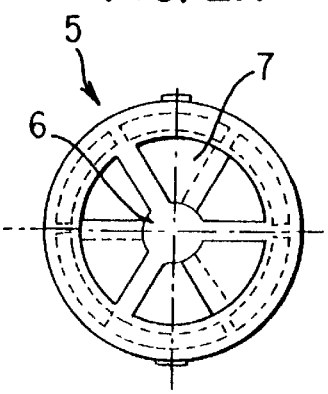
FIG. 2 is a view in projection and partial section of a first element of the flow meter of FIG. 1.
Figure 2B:
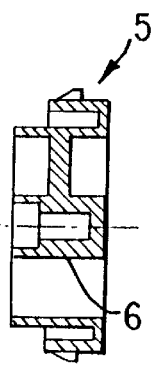
Figure 3A:
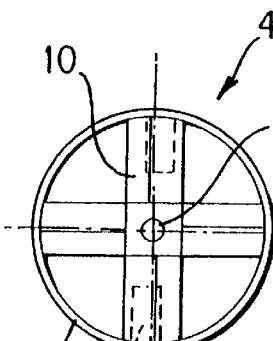
FIG. 3 is a view in projection and partial section of second element of the flow meter of FIG. 1.
Figure 3B:
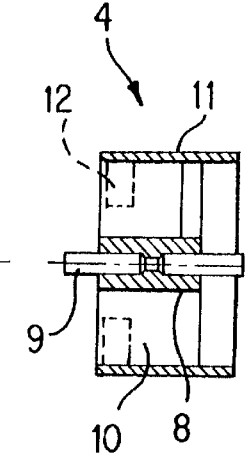
Figure 2C:
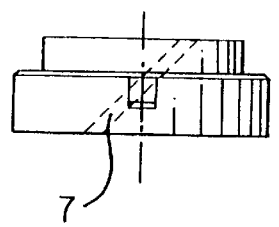
Figure 3C:
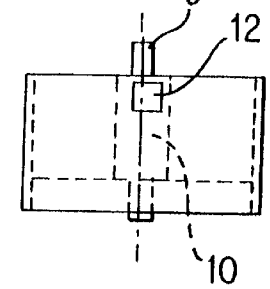

In FIGS. 1 to 4, a known detection device is illustrated, of the type described in the Italian Patent Application no. AL92A000003, in the name of the present Applicant. Such a device comprises a flow sensor 1, which can be inserted within a generic hydraulic duct 2, partially visible in FIG. 1, and a detection unit 3, which is arranged externally to the same duct.

The sensor 1 is of the turbine type and to this purpose, it comprises an axial impeller 4, with tilted blades, to which a flow distributor or diffuser 5 is associated.

The distributor 5 has a central core 6, from which helical blades 7 extend, able to direct the liquid flow on the peripheral surface of the blades 10 of the underlying impeller 4.

The impeller 4 has a central core 8, being integral with an axial pivot 9, and is provided with helical blades 10, which are tilted in the opposite direction with respect to the blades 7 of the distributor 5; blades 10 are connected in their external part by a protection ring 11; in correspondence with one or more blades 10, on the external side of the ring 11, magnetic elements 12 are inserted.

The axial pivot 9, that realizes the rotation axis of the impeller 4, is supported at its ends by a first self-lubricating bush 13 and by a second self-lubricating bush 14, this latter being sustained by a thrust-bearing element 15 (being for instance realized through a hard lapped stone); the bush 13 is housed in the core 6 of the distributor 5, while the bush 14 and thrust-bearing element 15 are housed in a body 16, that contains the impeller 4 and that is able to be mechanically coupled, in its upper part, to the distributor 5.

The unit 3, that is fixed to the external part of the duct 2, in axis with elements 12 of the impeller 4, includes a magnetic field detector 17, such as a Hall effect sensor, being mounted on a printed circuit which also acts a male connector 18.

Figure 4:
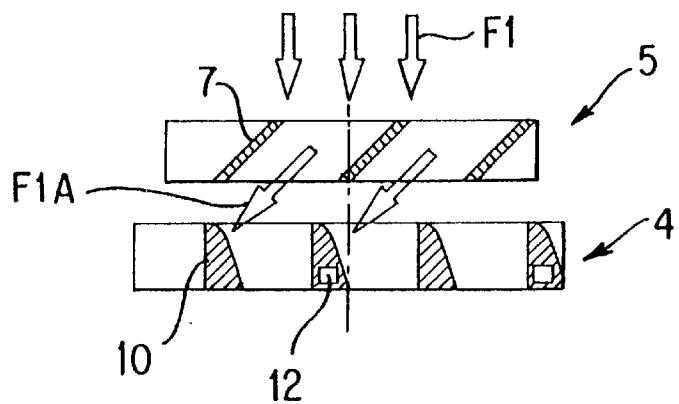
FIG. 4 is a schematic section that illustrates the operating principle of the meter of FIG. 1.
Figure 5:
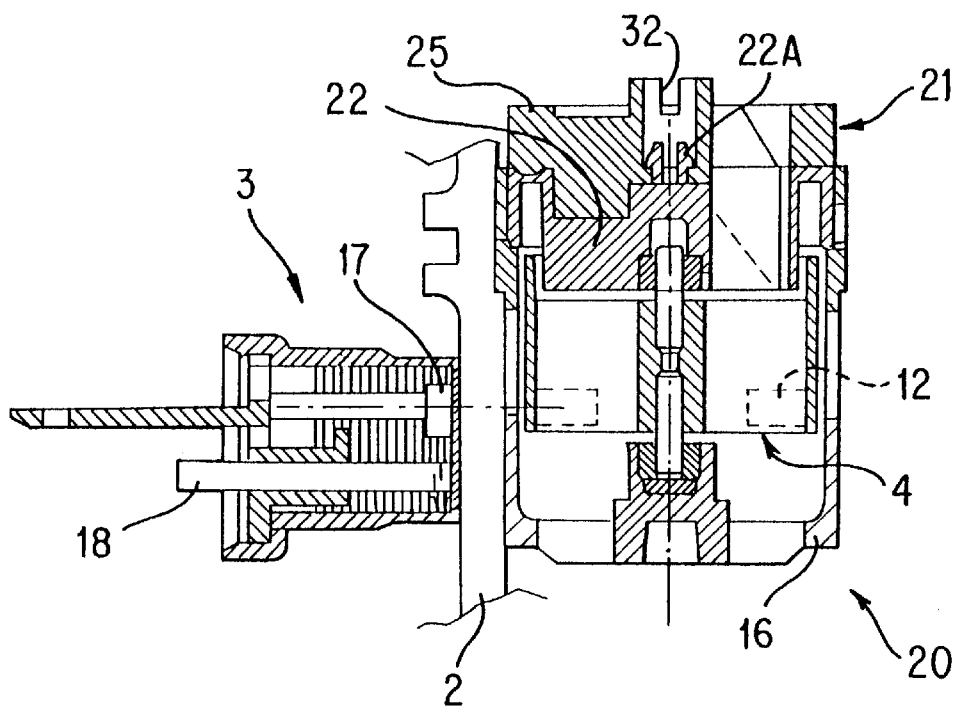
FIG. 5 is a view in section of a device according to the present invention.

In FIG. 4, the flow distributor 5 and the impeller 4 have been represented in a schematic way; with F1 a generic liquid flow to control is indicated, that flows in the duct 2 where the sensor 1 is inserted; as can be noticed, said flow F1, which is initially axial to the duct, is deviated by the blades 7 of the distributor 5 and conveyed on the blades 10 of the impeller 4; as already said, the blades 7 are oriented in the opposite sense with respect to the blades 10, in order that the flow which exits the distributor, being indicated with F1A, determines a vectorial force that acts on the impeller 4, thus causing the rotation of the latter.

As can be noticed, the blades 7 determine the angle of incidence of the liquid flow F1 on the blades 10, and as a result the value of the vectorial force that determines the rotation of the impeller 4.

The rotation of the impeller 4 determines the rotation of the magnetic elements 12, being integral with the blades 10, in order to induce a signal in the detection unit 3; such signal, being constituted by electric impulses, is a digital signal and therefore can be easily interpreted by a microprocessor, making up part of a control unit (not represented in the Figures for simplicity sake) which is associated to the device.

It is clear that, with the same quantity of fluid flowing in the duct where the sensor 1 is inserted, the number of revolutions of the impeller 4 is a function of the angle of the blades 7 and/or the blades 10; in line of principle, the number of revolutions of the impeller, the liquid quantity being the same, is therefore a proper characteristic value of each turbine meter, and determines the efficiency or the measure resolution.

Thus, the number of impulses generated by the rotating blades 10, is a function of the quantity of flowed fluid, in accordance with predefined diagrams (the cited "characteristic value" or resolution); the number of such impulses, referred to an established time unit, is proportional to the flow rate of the fluid for a pre-determined geometry of the blades 10 and the blades 7.

Thus, considering that the cited microprocessor is perfectly able to count the time through an internal timer (CLOCK), it appears clear that, by way of the device 1, it is possible to calculate with precision the flow rate and the quantity of the flowing liquid.

Devices of the type illustrated in FIGS. 1–4 are susceptible of different applications, such as for example, in connection with ON/OFF valves, or valves of the proportional type, or dosing devices, etc, and in different technological fields, such as washing machines, or air conditioning plants, or drink dispensers, etc.

Such applications may differ to a great extent, in relation to the type of rates of liquid to be measured, or in relation to the required measurement precision. Within such frame, therefore, the present invention proposes to indicate a device for the control of the quantity and/or the flow rate of a liquid being very flexible in relation to the variable needs.

To this purpose, in FIGS. 5–10 the device according to the present invention is represented; in such Figures the same reference numbers of the previous Figures are partly used, for indicating technically equivalent elements.

The flow sensor of the device according to invention, being indicated with 20, is provided with an adjustable diffuser or flow distributor 21, in order to allow the variation of the angle of incidence of the liquid flow on the blades 10 of the impeller 4: in such a way, therefore, it is possible to vary in a corresponding way the efficiency of the impeller, and consequently, the measure resolution of the device.

The adjustable flow distributor 21 comprises a first fixed element, indicated with 22 (FIGS. 7 and 9), having a section being substantially circular, which is mechanically fixed to the container body 16; the fixed element 22 is provided with a first series of tilted blades 23 and three positioning seats, indicated with 24A, 24B and 24C. The blades 23 are each defined by three tilted planes 23A, 23B and 23C; in the illustrated case, the plane 23A is parallel to the axis of the impeller 4.

To the upper part of the fixed element 22 an angularly movable element is coupled (for example with a release coupling), indicated with 25 (FIGS. 6 and 8), also having a substantially circular section; to this purpose, the element 22 has centrally, in its upper part, flexible appendixes 22A, and the element 25 has centrally, in its lower part, a seat 25A being able to receive the cited appendixes 22A.

The movable element 25 is provided with a second series of blades 26; such blades 26 are defined by four tilted planes 27, 28, 29 and 30; the plane 30, in the illustrated case, is parallel to the axis of the impeller 4; such planes 27–30 are in particular arranged in such a way that the shape of the blades 26 can be coupled with the shape of the blades 23, which have substantially a rectangle triangle section; in other words, therefore, the blades 23 and 26 have complementary surfaces.

The movable element 26 furthermore comprises a positioning tooth 31, and a seat 32 for a tool, such as a screwdriver, for operating an adjustment, that consists in the modification of the angular position of the element 25 with respect to the element 22. The functioning of the device according to the invention will now be described with reference to the FIGS. 10, 11 and 12 in which there are represented, by way of schematic sections, the details 22 and 25 of the adjustable distributor 21, the impeller 4 and a generic flow F1 to be measured.

Figure 10:
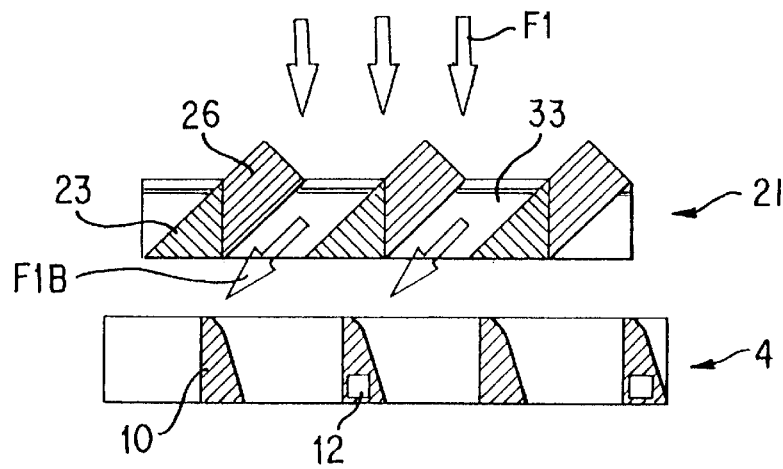
FIGS. 10, 11 and 12 are three schematic sections that illustrate the operating principle of the device according to the present invention, where the elements of FIGS. 8 and 9 have been shown in three different working positions.
Figure 11:
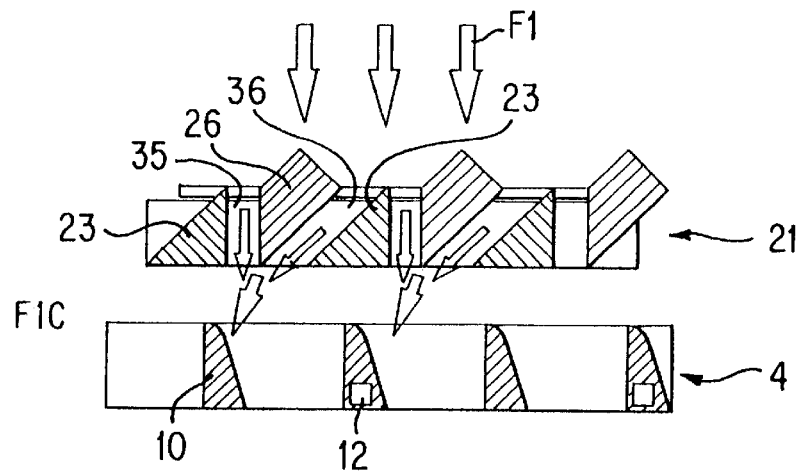
Figure 12:
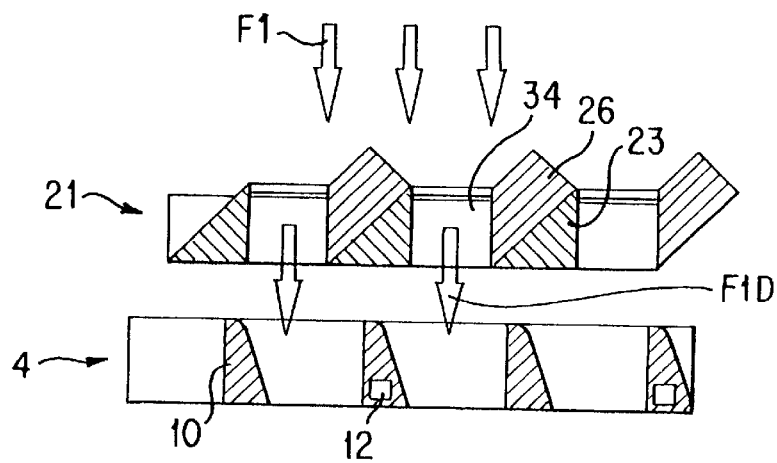

In particular, in FIGS. 10, 11 and 12, the distributor 21 is schematically represented in three different working conditions, depending upon the fact that the tooth 31 of the movable element 25 is engaged in the seat 24A, or the seat 24B, or the seat 24C of the fixed element 22; the working position of the element 25 is in fact assured by the tooth 31, which engages in one of said seats (obviously, the tooth 31 could be realized on the fixed part 22 and the seats 24A, 24B and 24C could be provided on the movable part 25).

In FIG. 10, the movable element 25, is in the first working position, in which the tooth 31 is engaged in the seat 24C; in that case, the plane 30 of the blades 26 is adjacent to the plane 23A of the blades 23 of the element 22; as can be noticed, in such a condition, surfaces 23 of the blades 26 constitute in practice a prolongation of surfaces 23C of the blades 23; the flow F1 is conveyed by means of channels 33, being defined by the surface 23C of the blade 23 and the plane 29 of the blades 26; in such a position of the movable element 25, the maximum incidence value (or slope) onto the blades 10 of the impeller 4 is obtained for the flow F1B which exits the distributor 21: in such a condition a high ratio is obtained between the number of revolutions of the impeller 4 (or the value of the signal of the magnetic field detector 17), and the fluid quantity that passes through the duct where the sensor 20 is inserted.

In FIG. 12 the movable element 25 is in a second possible working position, in which the tooth 31 is engaged in the seat 24A; as can be noticed, in this case, the lower tilted plane 29 of the blades 26 is adjacent to the plane 23C of the blades 23 and the flow F1 is conveyed by means of channels 34, being defined by the planes 30 and 23A of the blades 26 and 23 respectively; in this case, a minimum incidence value is obtained, or slope, of the flow F1D which exits the distributor 21, with respect to the blades 10 of the impeller 4; in such a condition a low ratio is obtained between the number of revolutions of the impeller 4 (or the value of the signal of the detector 17), and the quantity of the fluid which passes through the duct.

In FIG. 11, the movable element 25 is instead in an intermediate position, if compared to the previous ones, in which the tooth 31 is engaged in the seat 24B; as can be noticed, the flow F1 is in this case conveyed by two series of channels, indicated with 35 and 36, the first being defined by the planes 23A and 30 of the blades 23 and 26, and the second being defined by the planes 29 and 23C of the blades 26 and 23; in this case, the value of incidence of the flow F1C which exits the distributor 21, and the relevant operating vectorial force on the impeller 4, is the result of the different distribution of the flow F1 in the two different series of channels 35 and 36 which, as can be noticed, have different angles and sections. In this condition, the ratio between the number of revolutions of the impeller 4 and the quantity of fluid which passes through the duct is intermediate if compared to the two previously shown.

It is clear that, according to the invention, a quick and safe variation is allowed of the ratio between the number of revolutions of the impeller 4 and the flowed liquid quantity; for example, the selection being illustrated in FIG. 10 allows to obtain about 230 impulses per a liter of water, the selection of FIG. 11 about 130 impulses per a liter of water and the selection of FIG. 12 about 50 impulses per a liter of water.

It should be finally noticed that the slope of the planes 27 and 28 of the blades 26 allows the liquid flow to be always distributed towards the channels through which the liquid must flow.

It should also be highlighted that, according to the invention, the total passage section of the liquid chains unchanged, irrespective of an operated selection, and therefore undesired charge or pressure losses are avoided in the hydraulic circuit where the device 1 is inserted.

As said, the cited adjustment may be carried out in a very easy way, by producing a simple angular movement of the element 25; this can be carried out for example in the installation phase, by inserting a screwdriver in the duct where the body 16 is arranged, in correspondence with the seat 32, and however with a very limited risk of error, due to the fact that only three positions are possible, being well defined by the stepping of the tooth 31 in the chosen seat 24 (A or B or C).

Such a material selection on the distributor 21, that allows to increase the versatility of the device according to invention, may be advantageously coupled to the possibility of a selection, or configuration, also at the level of the control logic of the system of measure to which the device according to invention is associated.

Such configuration possibility allows the logic control circuit, to interpret in different ways, depending upon the cases, the ratio between the quantity of signals generated by the unit 3 and the quantity of liquid flowed through the sensor 20; in other words, the microprocessor of the control unit of the device can couple the type of chosen configuration with a table of pre-determined data, which are stored in suitable memory means being associated to the same microprocessor; such data will correspond to different liquid flow rates diagrams and different values of the ratio between the signal exiting unit 3 and the quantity of liquid in transit, and in the microprocessor memory data will be present, which allow to calculate the quantity or the flow rate of the liquid flowed through the sensor 20.

It is clear that also such possibility of different configuration is particularly useful, in order to further increase the versatility of the device according to invention, in function of the level of required precision and so also in function of the duration of the life of the same device.

As said, in fact, the same device can be used with different categories of utilizing apparatuses (ON/OFF valves, proportional valves, dosing devices, etc) and allows the achievement of a great adjustment precision. However, it is clear that flow sensors of the known type, for example those designed for obtaining the greater measure resolution at the low fluid rates (for example 0.5 liters per minute), will degrade to a great extent if used at high rates (for example 20 liters per minute), such degrade being the consequence of the greater wear of the mechanical components, due to the greater number of revolutions of the impeller 4, with the same time of use.

According to the invention, on the contrary, it is possible, depending upon the type of use of the device, to privilege the measure precision, that is a typical need of applications with low rates (i.e. for a dosing device) or the useful life of the device, that is a need more felt in the case of applications with high rates (i.e. heating plants). The characteristics of the present invention are clear from the given description, as are clear its advantages.

In particular, according to the invention, a turbine type flow sensor 20 is indicated, in accordance to which a quick and safe adjustment is allowed of the ratio between the number of revolutions of an impeller 4 and the quantity of flowed liquid. This is obtained by providing a flow distributor 21 comprising a movable part being susceptible of assuming at least two different working positions and a fixed part 22, which cooperate in order to define passage channels 33–36 having different slopes, depending upon the chosen position for the movable part 25.

The variation of the position of the movable part 25 may be advantageously coupled to a selection which can be operated on the control unit of the device (for example microswitches could be provided to this purpose); in such a way, the control unit is able to couple the type of position of the movable part 25 with a table of pre-determined data; the data of such a table correspond to different diagrams of the flow rates, or to different values of the ratio between the signal exiting a survey unit 3 and the quantity of the flowing liquid.

The device according to invention is therefore very flexible if compared to the known devices because, notwithstanding the substantial similarity of the basic structure, it can be differently prearranged depending upon the requirements.

It is clear that numerous changes are possible for the man skilled in the art to the device described as an example, without departing from the novelty principle of the inventive idea.

According to a first possible variant embodiment, the element 25 could be moved in an automatic way, through a suitable actuator. Such an actuator could be for example of the thermal type, which can expand and/or retract proportionally to the temperature of the liquid to be measured; such solution allows to compensate certain measurement errors, being due to the volume variations of the liquid at different temperatures; in this case the actuator could be constituted by an expanding element, such as a small piston containing a material being expandable in temperature (e.g. wax).

Alternatively, the cited actuator could consist in a bimetallic element, or in an element formed by an alloy of shape memory, of the type realized as a spiral spring that, by lengthening and/or shortening, angularly moves the element 25.

As already said, the device according to the invention is also susceptible of use in connection with valves of the proportional type, i.e. valves in which the shutter is linearly movable, and able to assume a plurality of different positions, in order to shut a liquid flow.

In such a type of application, the element 25 could be moved by exploiting the movement of the cited shutter. In such a case, therefore, the control unit of the device will have a table of pre-determined data, where each linear position of the shutter corresponds to a different diagram of the flow rates, and/or a different ratio between the number of revolutions of the impeller and the quantity of liquid in transit.

A further possible variation is that of providing a suitable actuator, being controlled by the control unit of the device according to invention, for producing the angular movement of the element 25; in such a case, the movement could be controlled in function of selections carried out through suitable means, such as buttons or switches.

The device according to invention could furthermore be provided with other additional elements, in order to stabilize the flow, such as a flow regulator, coaxial to the rotor and arranged downstream of this latter; such flow regulator could for example be of the variable section type, that utilizes the deformation of an elastically deformable membrane for self-adjusting the passage of the liquid.

The detection system of the impeller rotation could furthermore be different from that herein described: for example, it could be based on a detection of the optical type rather than a magnetic one.

Furthermore the possibility could be provided to vary the slope of the blades of the rotor; said variation could be for example carried out in a way being similar to that previously described with reference to the distributor 21; within such frame, also the impeller could be realized in at least two distinct parts, coupled between themselves and susceptible of assuming a plurality of different reciprocal working positions, to which correspond different angles of the blades of the same impeller.

I claim:

1. In a device for the control of the quantity and/or the flow rate of a liquid, of the type comprising an impeller, having a plurality of blades, and arranged in use within a duct wherein the liquid flows, and a unit able to detect the rotation of the impeller, in particular for determining from the rate of rotation of the impeller the quantity and/or the flow rate of the liquid that flows in the duct, the improvement comprising distributor means mounted within said duct for selectively modifying the angle of incidence of the liquid flow on the impeller to control the ratio between the rate of rotation of the impeller and the rate of fluid flow in the duct in which the impeller is inserted.

2. Device, according to claim 1, wherein said distributor means is arranged upstream from the impeller and able to direct with a predetermined angle the liquid flow onto the blades of the impeller, the distributor further comprising adjustment means able to assume a plurality of different working positions corresponding to different angles of incidence of the liquid flow blades of the impeller.

3. Device, according to claim 2, whereby said adjustment means comprise at least a movable element, being able to assume a plurality of different working positions.

4. Device, according to claim 3, whereby said adjustment means comprise a fixed element, that cooperates with said movable element for determining the angle of incidence of the liquid flow onto the blades of the impeller.

5. Device, according to claim 4, whereby said fixed element and said movable element have surfaces being complementary.

6. Device, according to claim 5, whereby said complementary surfaces make up part of blades being defined by said fixed element and blades being defined by said movable element.

7. Device, according to claim 4, whereby said fixed element and said movable element cooperate for defining channels through which the liquid flow is conveyed towards the blades of the impeller, said channels having angles or sections which are a function of the position selected for said movable element with respect to said fixed element.

8. Device, according to claim 4, further comprising means for coupling said fixed element to said movable element.

9. Device, according to claim 4, whereby said movable element has a positioning tooth and said fixed element has a plurality of seats for said tooth, or vice versa.

10. Device, according to claim 3, wherein said movable element has a seat able to receive a tool for varying the working position of said movable element.

11. Device, according to claim 3, wherein said movable element is angularly rotatable, in order to allow the variation of its working position.

12. Device, according to claim 4, wherein said movable element is arranged upstream from said fixed element relative to the fluid motion.

13. Device, according to claim 2, further comprising actuation means for varying the working position of said adjustment means.

14. Device, according to claim 13, wherein said actuation means comprise a thermal actuator that expands and/or retracts proportionally with the temperature of the liquid.

15. Device, according to claim 14, wherein said actuator includes an element containing a material expandable according to temperature.

16. Device, according to claim 14, wherein said actuator comprises a bimetallic element.

17. Device, according to claim 14, wherein said actuator comprises an element of a shape memory alloy.

18. Device, according to claim 1, further comprising a linearly movable shutter able to assume a plurality of different positions for controlling a proportional valve.

19. Device, according to claim 1, further comprising a logic control unit, which can be configured according to the efficiency being assigned to the impeller or the working position being selected for said adjustment means.

20. Device, according to claim 19, wherein said logic control unit can be configured for interpreting in different ways the signals generated by said unit, depending upon the efficiency assigned to the impeller or the working position selected for said adjustment means.

21. Device, according to claim 1, further comprising a flow regulator downstream from the impeller.

22. Device, according to claim 1, whereby means are provided for varying the slope of the blades of the impeller.

23. Device, according to claim 22, whereby the impeller comprises at least two distinct parts, mutually coupled and being able to assume a plurality of different reciprocal working positions, to which different slopes of the blades of the impeller corresponds.

24. A method for adjusting the sensitivity of a flow rate sensor which measures the rate of rotation of an impeller mounted within a duct through which flow occurs by controlling the ratio of the rate of rotation of the impeller to the rate of flow comprising mounting within the duct upstream of the impeller, a distributor having openings through which the fluid is incident on the impeller, and adjusting the openings to vary the direction of flow through the distributor and, hence, the angle of incidence of the liquid on the impeller.

* * * * *